March 5, 1963 C. H. ARRINGTON, JR 3,080,319
MAGNETIC RECORDING MEMBERS AND THEIR PREPARATION
Filed Oct. 22, 1959
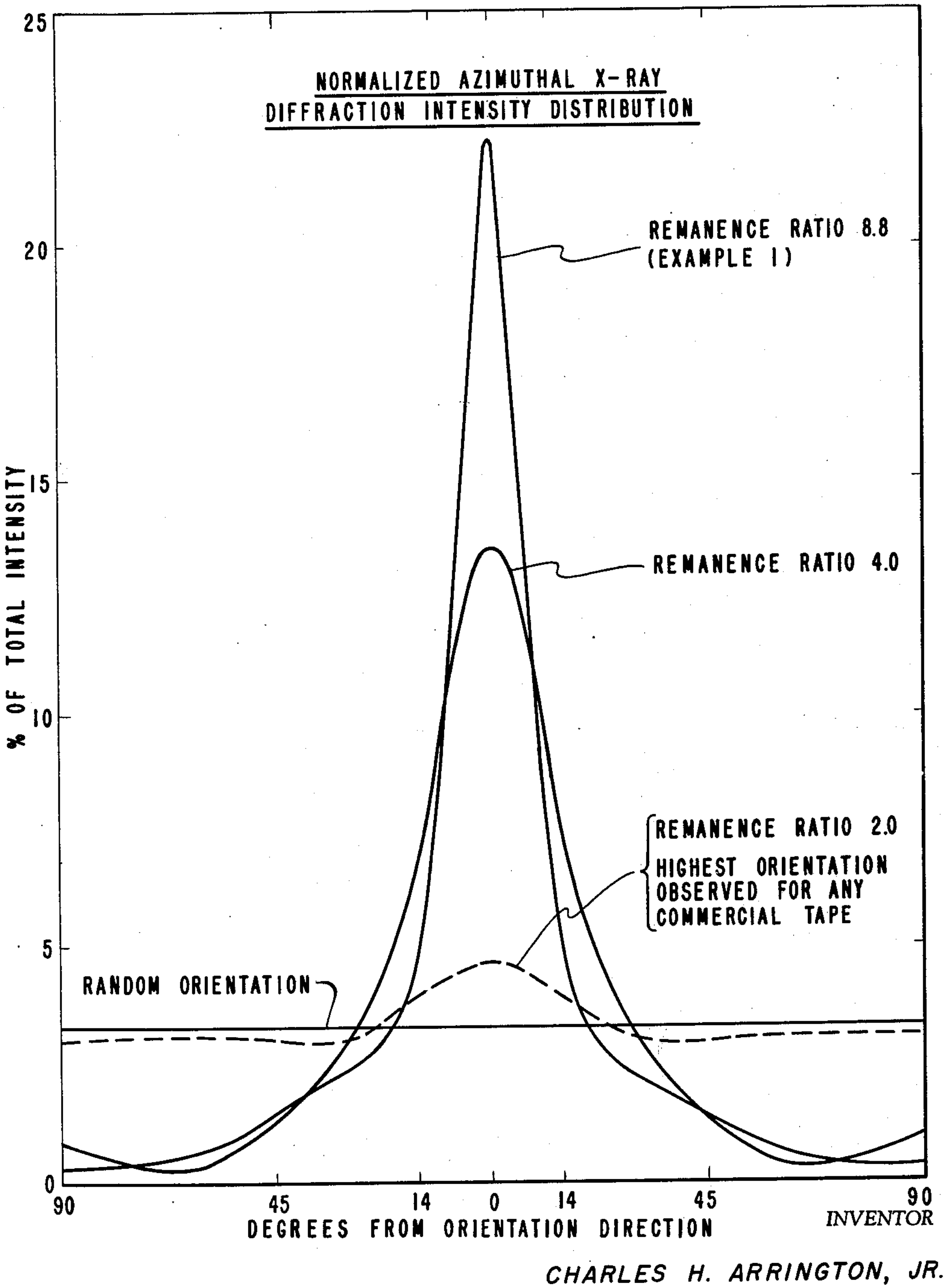
INVENTOR
CHARLES H. ARRINGTON, JR.
BY C. Harold Herr
ATTORNEY 3,080,319
Patented Mar. 5, 1963

3,080,319

MAGNETIC RECORDING MEMBERS AND THEIR PREPARATION

Charles H. Arrington, Jr., Wilmington, Del., assignor to E. I. du Pont de Nemours and Company, Wilmington, Del., a corporation of Delaware Filed Oct. 22, 1959, Ser. No. 847,974
4 Claims. (Cl. 252—62.5)

This invention relates to new and improved magnetic recording members and to a process for their manufacture. More particularly, this invention relates to magnetic recording members in which the magnetic phase is highly oriented.

Conventional magnetic recording tapes usually consist of a magnetic material, commonly gamma-iron oxide, in particulate form dispersed in a non-magnetic binder. To obtain the desired mechanical strength, the iron oxide/binder composition may be adhered to a non-magnetic base or supporting film or the binder itself may be so chosen as to provide the necessary strength. Although such tapes can be used for information storage, means for increasing their capacity have been sought. One such means which is used commercially consists of exposing the tape at a stage in its preparation when the binder is sufficiently fluid to allow movement of the magnetic particles to a magnetic field which aligns the particles so that their easy directions of magnetization tend to be parallel. Tapes prepared in this way do indeed exhibit moderate improvements in information storage capacity as indicated by the fact that remanence measured in the direction of alignment is increased over that observed for unaligned tapes. The degree of particle alignment in such tapes has been expressed as a ratio of this remanence to remanence measured in the direction perpendicular to alignment. This is the so-called remanence ratio. For unaligned tapes the remanence ratio is in the neighborhood of 1 and for the best commercial aligned tapes the ratio is about 2. In spite of their higher remanence ratio, remanence in the perpendicular direction for these aligned tapes remains undesirably high and the perfection of particle orientation is relatively low as demonstrated by the fact that when examined by X-ray diffraction techniques these tapes show little evidence of crystalographic orientation (see the drawing).

It has now been found that magnetic recording members exhibiting a very high degree of parallel alignment of a magnetically anisotropic material can be prepared and that such members possess greatly improved properties. These improved magnetic recording members are characterized by a preponderance of highly oriented anisotropic magnetic material as evidenced by the occurrence of at least 50% of the total normalized azimuthal X-ray diffraction intensity within an angle of 14° of the direction of orientation. Preferred magnetic recording members exhibit 50% of the total intensity within 10° of the direction of orientation.

The remanence ratio of the recording members of this invention is at least 5.3 and preferably above 8.0. Remanence in the direction of orientation ranges from about 70% up to more than 90% of saturation, as compared to a value of 75% for the best commercial instrumentation tapes. Remanence in the perpendicular direction is less than 15% and usually less than 10% of saturation, as compared to 35% and higher for commercial tapes. Thus, the recording members of this invention exhibit desirably high remanence in the direction of orientation indicative of high storage capacity and output. This is combined with desirably low remanence in the perpendicular direction.

Pronounced orientation of the magnetic phase is best achieved when the ferromagnetic anisotropic material is in the form of acicular particles, and especially so when these particles are single crystals (i.e., when each particle is composed of a single crystalline region which is free of intercrystal boundaries). It is particularly desirable that the long axis of each particle coincides with one particular crystallographic axis of the ferromagnetic material. It is preferred that the ferromagnetic material be in single crystal acicular form and that it possess magnetocrystalline anisotropy with a unique axis of easy magnetization which coincides more or less with the acicular axis. Ferromagnetic chromium oxide is readily prepared in a form exhibiting these characteristics and is a preferred material for use in this invention. The preparation of suitable forms of ferromagnetic chromium oxide is described, for example, in U.S. Patents 2,885,365, 2,923,683, 2,923,684 and 3,034,988.

These improved magnetic recording members are prepared by a novel process in which orientation is achieved by a combination of magnetic and mechanical means. This process also forms a part of the invention.

By this process, recording members exhibiting high remanence ratios are readily prepared. For best results, it is desirable that the orientation by each method taken singly be sufficient to produce a remanence ratio of at least 1.5. When this is done, remanence ratios in the final products greater than 5.3 are easily obtained.

Magnetic recording members prepared in accordance with this invention can be any of the types known in the art. Magnetic orientation of the magnetic material in the recording member is carried out by exposing the member to a magnetic field while the binder; is in a fluid or easily deformed condition. The binder; is then coalesced. Mechanical orientation is usually produced by elongating the member after the binder has become self-supporting.

The ferromagnetic material employed in preparing these novel recording members can be any of the ferromagnetic materials which are capable of being produced in anisotropic form. Individual particles should be acicular, preferably smaller than 2 microns in length and preferably having an axial ratio, i.e., the ratio of length to transverse dimension of at least 5:1.

The concentration of magnetic material in the magnetic portion of the recording member will usually be in the range of 25–70% by weight. However, higher or lower concentrations can be employed if desired. Commercial tape coatings usually contain about 70% magnetic phase. In general, the higher the concentration of magnetic phase, the higher the output of the tape. However, other factors such as mechanical strength and surface smoothness may be adversely affected by increased concentrations and extremely high concentrations of magnetic phase are generally undesirable. Due to the high specific magnetization exhibited by ferromagnetic chromium oxide, this oxide can be used at lower concentrations than are required when gamma-$Fe_2O_3$ is employed to produce tapes of equivalent output. Of further advantage, ferromagnetic chromium oxide possesses magnetic anisotropy and is more easily magnetized along the tetragonal axis than in a direction perpendicular thereto. Moreover, the tetragonal axis coincides in the acicular particles with the needle axis.

For the preparaton of high quality recording members, it is preferred that the magnetic material possess a saturation per gram or sigma value $\sigma_s$, of at least 60 gauss-cm.$^3$/g. Materials having a saturation per gram above 65 gauss-cm.$^3$/g. and especially those having a saturation above 75 gauss-cm.$^3$/g. yield particularly desirable products.

It is also desirable that the intrinsic coercive force of the magnetic phase be within certain limits such that resistance to magnetization and demagnetization is sufficiently great that the recording member is not adversely affected to any great extent by small adventitious fields with which it may come in contact but at the same time is readily adaptable to the signal imposed by recording instrumentation. It is usually desirable that the intrinsic coercive force be in the range of 100–400 oersteds. However, when high resolution is a problem, products having coercive forces about 400 oersteds may be preferable.

Coated tapes may be prepared by any of the methods known in the art such as, for instance, solution coating, melt coating or dispersion coating. For preparation of a coated tape, the ferromagnetic material is first dispersed in a suitable liquid medium, for example, a mixture of toluene and tertiary butyl alcohol, containing a dispersing agent if desired, by ball-milling or other conventional means. To this dispersion is added a solution or dispersion of the desired binder, together with plasticizing agents if necessary, and milling is continued until the whole is thoroughly mixed. The binder may be, for example, polyvinyl butyral, plasticized with dibutyl sebacate. The dispersion is filtered through layers of cotton, felt, cloth, and the like, to remove any agglomerates still remaining, then degassed and coated onto the desired backing film by conventional means, for example, by doctor knife application. Suitable backing films are those which can be elongated permanently and include polyethylene terephthalate, polyvinyl fluoride, polyvinyl chloride, polyvinylidene fluoride, polyacrylonitrile, cellulose acetate butyrate, cellulose acetate, polypropylene, and the like. The selection of the backing film is, of course, influenced by the fact that after elongation to mechanically orient the magnetic particles it must provide adequate resistance to further stretching, tearing and mechanical deformation. Dispersions of polyvinyl fluoride containing $CrO_2$ can be coated on a preformed film, for example, polyvinyl fluoride and yield useful recording members.

The materials enumerated above as suitable for use as backing members for coated tapes can also be used as binders in the preparation of integral tapes, i.e., tapes in which the backing material also serves as binder. However, it has been found the polyvinyl fluoride is especially desirable in the preparation of such tapes because of its small coefficient of friction which facilitates passage of the tape over the recording or playback head thereby reducing drag and tape wear, as well as the fact that it is available in particulate form (suitable for preparation of dispersion) directly on polymerization.

In the preparation of an integral magnetic tape employing polyvinyl fluoride as the binder, a convenient processing method is as follows: The ferromagnetic material and polyvinyl fluoride, both in finely divided particulate form, are ball-milled with a latent solvent for the polyvinyl fluoride until a smooth dispersion is produced. When the mixture has reached this stage, additional latent solvent is added with continued mixing until the dispersion contains from about 15 to about 35% total solids. This dispersion is then sand-milled one or more times as described in U.S. Patents 2,581,414 and 2,855,156. In sand-milling, the orifice of the equipment is fitted with a screen of at least 325 mesh. The resulting dispersion is deaerated by evacuation with stirring and cast on a smooth surface by known procedures.

Whether coated or integral tapes are being prepared, it is necessary for attainment of satisfactory remanence ratios in the final product that the binder be a material capable of undergoing mechanical orientation and the particles of ferromagnetic material be discretely distributed in the binder. The presence of aggregates or clusters of the ferromagnetic particles makes subsequent alignment more difficult and interferes with realization of the degree of alignment required for high remanence ratios.

While the binder retains sufficient fluidity to allow motion of the magnetic particles, the coated or integral tape prepared as described above is passed through a magnetic field to align the particles of ferromagnetic material in the binder in the desired direction. To assist in alignment, it is convenient to reverse the field several times during the transit of any given portion of the recording member through the field. When fields provided by horseshoe magnets or opposed like magnetic poles are employed, reversal is inherent in passage of the recording member through the field. When the field is provided by a solenoid, field reversal may be accomplished by reversal of the current. With D.C. fields, it is preferred that the field strength be at least 300 oersteds.

After or during magnetic orientation of coated or integral tapes, heat is applied at a temperature and for a time sufficient to increase the viscosity of the binder and render the ferromagnetic particles relatively immobile. If melt casting is employed to prepare the recording member, it will be necessary to cool at this stage. In processing integral tapes, it may be desirable at this stage to cast a layer of polymer, free of magnetic material, on the back of the tape to provide additional strength. The tape is next mechanically oriented in the direction of magnetic particle alignment by any of several methods applicable to orientation of polymer films, e.g., stretching to at least 100% of the original dimension, i.e., a stretch ratio of 2×. This stretching may be carried out by any of the processes known in the art. Stretching improves the physical properties of the film and at the same time increses the degree of perfection with which the individual magnetic particles are aligned within the film. After stretching, any solvent remaining in the film is removed; the tape is slit to the desired width and wound on reels or placed in other suitable containers for storage.

As mentioned earlier, the magnetic recording members of this invention and the ferromagnetic materials used therein exhibit several properties which are critical factors in their usefulness. These properties are, for the magnetic material, the intrinsic coercive force, $H_{ci}$, and the saturation per gram, $\sigma_s$; for the recording member, the azimuthal X-ray diffraction intensity distribution, the remanence parallel and perpendicular to the direction of orientation and the remanence ratio. The definitions of the intrinsic coercive force and remanence are given in Special Technical Publication No. 85 of the American Society for Testing Materials, entitled "Symposium on Magnetic Testing" (1948), pp. 191–198. The values for the intrinsic coercive force given herein are determined on a D.C. ballistic-type apparatus which is a modified form of the apparatus described by Davis and Hartenheim in the "Review of Scientific Instruments," 7, 147 (1936). The sigma value, $\sigma_s$ is defined on pp. 7 and 8 of Bozarth's "Ferromagnetism," D. Van Nostrand Co., New York (1951). This sigma value is equal to the intensity of magnetization, $I_s$, divided by the density, $d$, of the material. The sigma values given herein are determined on apparatus similar to that described by T. R. Bardell on pp. 226–228 of "Magnetic Materials in the Electric Industry," Philosophical Library, New York (1955).

The azimuthal X-ray diffraction intensity distribution is determined from the spectrogoniometer pattern obtained by exposing a section of the recording member to a beam of X-rays perpendicular to its surface. The diffracted radiation is measured by a local intensity direct recording measuring receiver located at the proper angle, with respect to the incident beam, so as to record the diffraction from the desired interference while the sample is rotated about the axis of the incident X-ray beam. For simplicity, it is preferred to use a relatively intense interference, resulting from an atomic plane in the crystal which is perpendicular or parallel to the direction of easy magnetization. With ferromagnetic chromium dioxide, this is taken as the 110 plane.

The General Electric Model SPG Spectrogoniometer is used in conjunction with the Model XRD–5 X-ray diffraction apparatus, also manufactured by the General Electric Company. A synchronous motor-driven mount, positioning the sample essentially perpendicular to the incident beam and permitting rotation of the sample as described above, is used for the primary measurement of the intensity distribution pattern. Zirconium-filtered molybdenum K-alpha radiation is used, together with a krypton-filled Geiger-Muller Counter. The X-ray tube is operated at 20 milliamps and 50 kilovolts, and the X-ray beam is collimated by passage through a 1° slit before striking the sample. The diffraction intensity distribution pattern is obtained on a strip chart recorder. In order to make a suitable background correction for incoherent radiation, two wide angle diffraction patterns are also obtained, in which the diffraction pattern is measured as a function of the Bragg angle, using parafocusing geometry essentially as described, for example, in Klug and Alexander, "X-Ray Diffraction Procedures," Wiley, New York, 1954, p. 235 ff. For one of the latter patterns, the sample is mounted with the stretch direction substantially parallel to the incident beam, and for the other, with this direction substantially at right angles to the beam. On each of the resulting traces, a straight line is drawn between the intensity measured at a Bragg angle $2\theta$ of 3.5° and at 35°. The incoherent background is taken to be the position of this line at the $2\theta$ corresponding to the 110 interference, i.e., 13.5°, averaged between the two traces obtained in this manner. The incoherent background found in this manner is then subtracted from the intensity distribution pattern measured during rotation of the sample as described above.

The intensity of the interference, corrected for background scattering as described in the preceding paragraph, is then normalized, i.e., the total interference is taken to be 100%, and the intensity at various points, expressed as a percentage of the total, is plotted as a function of angle of rotation measured from a convenient reference point, e.g., the equator, or maximum, in the X-ray pattern. For convenience in plotting, the intensities are averaged over uniform intervals of 6 degrees. For recording members having an oriented magnetic phase, the curve so obtained will possess at least one maximum per one-half revolution of the sample; for the products of this invention, this maximum will be such that 50% of the total normalized intensity per one-half revolution lies within 14° preferably within 10° of the orientation direction (see the drawing).

Remanence in the direction of orientation and in the perpendicular direction are determined on the apparatus described above for the measurement of sigma values. Samples of recording member are cut in the form of a square having two sides parallel to the direction of orientation and the measurements are made in directions parallel to the sides of the square. The saturation remanence or retentivity value in each direction is obtained by exposure to a saturating field or by calculation from measurements in a number of fields of increasing strength, and is used to calculate the remanence ratio. The value of the remanence ratio obtained in this way is lower than values which would be obtained by measurement in fields of lower intensity because of the fact that remanence measured in the transverse direction decreases more rapidly with decreasing field strength than remanence in the orientation direction. Since remanence in the transverse direction occurs in the denominator of the remanence ratio, fields insufficient to saturate the specimen produce a numerical value of the ratio which is larger than that produced in saturating fields.

Remanence in the direction of orientation is a measure of the information storage capacity of the recording member while remanence in the perpendicular direction is related to noise level. For high performance, it is desirable that storage capacity be as high and noise level as low as possible. The remanence ratio combines these two criteria into a single measure of quality which is relatively unaffected by the influence of other factors such as variations in surface smoothness, differences in concentration of magnetic phase, and the like.

The invention is illustrated further by the following examples in which the proportions of ingredients are expressed in parts by weight unless otherwise noted:

*Example I*

Ferromagnetic chromium oxide (22.1 g., intrinsic coercive force, 202 oersteds; saturation per gram, 79 gauss-cm.$^3$/g.) composed of acicular particles having a maximum length of about 2 microns and an axial ratio greater than 8:1 was milled for 29.5 hrs. with 60 g. of gamma-butyrolactone and 0.1 g. of dioctyl sodium sulfosuccinate, using 80 g. of ¼" diameter glass beads. Thereupon 4 g. of polyvinyl fluoride (inherent viscosity 3.3 measured at 30° C. in hexamethyl-phosphoramide) was added and milling continued for 17 hours. Upon completion of the milling, 39.5 g. of dispersion was removed from the mill, mixed with 18.4 g. of polyvinyl fluoride and 81 g. of gamma-butyrolactone and sand-milled three times through a 325-mesh screen.

The resultant dispersion was deaerated by evacuation with stirring and was used in the preparation of a film 2¾" wide by about 18" long by casting on a glass plate with a doctor knife setting of 20 mils. The cast dispersion was passed lengthwise once (i.e., two reversals of field) over the poles of a horseshoe magnet having a rated intensity of magnetization of about 6000 gauss in such manner that every spot on the film passed first over one pole then over the other pole of the magnet. The distance from each pole face to the film was about ⅛". After this treatment, the dispersion was coalesced by heating to about 150° C. in 70 seconds. A section of the resulting film, approximately 2" wide, was removed from the glass plate and permanently stretched 7.6× in length. It was converted into the form of tape by slitting to ¼" width and splicing several of the lengths so obtained end to end to obtain sufficient length for tests.

This integral tape was found by analysis to contain 33.9% by weight of magnetic phase. Remanence in the direction of orientation was 78% of saturation and the remanence ratio was 8.8. Fifty percent of the normalized X-ray diffraction intensity occurred within an angle of ±9° of the direction of orientation. The relationship between the normalized X-ray diffraction intensity and angle for this tape is shown in the drawing.

The ferromagnetic chromium oxide of this example was prepared by heating chromium trioxide with 0.5% (by weight based on $CrO_3$) $Sb_2O_3$ and 20% $H_2O$ at 400° C. under 600 atmospheres pressure for 3 hours.

*Example II*

Ferromagnetic chromium oxide having an intrinsic coercive force of 282 oersteds and a saturation per gram of 78.8 gauss-cm.$^3$/g. was employed in the preparation of magnetic tape as described in Example I. The tape was oriented by two passes over the faces of the horseshoe magnet as in Example I and was stretched 6.3×. The remanence ratio of this magnetic tape was 6.6 and the remanence in the direction of orientation was 83% of saturation.

*Example III*

Ferromagnetic chromium oxide (11.5 g.) having an intrinsic coercive force of 209 oersteds and a saturation per gram of 79.3 gauss-cm.$^3$/g. was ball-milled 28 hours with 60 g. of gamma-butyrolactone and 0.1 g. of dioctyl sodium sulfosuccinate. Five grams of polyvinyl fluoride was added and milling continued for 48 hours. Thereupon, 52 g. of gamma-butyrolactone and 16.4 g. of polyvinyl fluoride were added and the dispersion sand-milled three times through a 325-mesh screen. This dispersion contained approximately 35% (solids basis) magnetic phase.

This dispersion was cast using a 20-mil knife and portions of the casting treated as described below. In each case, the final tape was dried for 10 minutes in an oven at 150° C. before testing.

(*a*) The freshly cast dispersion was passed twice in one direction over a horseshoe magnet, then coalesced by heating, the resulting film stretched 6× at 101° C. and slit to tape. This tape had a remanence ratio of 8.6.

(*b*) The freshly cast dispersion was coalesced, the resulting film stretched 5.7× at 102° C. and slit to tape. The remanence ratio of this tape was 4.0.

(*c*) The freshly cast dispersion was passed five times in one direction over the horseshoe magnet used in part (*a*) of this example, coalesced and the resulting film slit into tape. This tape had a remanence ratio of 1.7. Normalized azimuthal X-ray diffraction intensity distribution curves for tapes having remanence ratios similar to those of the tapes of this example are shown in the drawing (attached).

*Example IV*

This example illustrates the preparation of a magnetic tape employing polyvinyl chloride as binder, and as magnetic phase a ferromagnetic chromium oxide having a coercive force of 428 oersteds and a saturation per gram of 72.3 gauss-cm.$^3$/g. This ferromagnetic chromium oxide was prepared by heating chromium trioxide with 0.5% (by weight based on chromium trioxide) antimony oxide and 2% ferric oxide in the presence of 20% water at a temperature of 400° C. under a pressure of 600 atmospheres for 3 hours.

The ferromagnetic chromium oxide (7.1 g.) was mixed with 37.2 g. of gamma-butyrolactone and 120 g. of glass beads and milled in an 8-oz. jar for 19 hours. A commercial polyvinyl chloride powder (3.1 g.) was then added and milling continued for 6 hours, whereupon an additional 10.1 g. of polyvinyl chloride and 15 g. of gamma-butyrolactone were introduced. After a further milling period of 16 hours, 15 g. of gamma-butyrolactone was added and the mixture subjected to a final milling for 3 hours. The mixture was removed from the jar, 3.4 g. of polyvinyl chloride and 0.5 g. of a commercial organotin heat stabilizer were added and the mixture sand-milled three times through a 450-mesh screen. The final dispersion contained 26% solids of which 30% was ferromagnetic chromium oxide.

This dispersion was cast on a glass plate using a 20-mil doctor knife. The cast dispersion was oriented by placing it along the axis of a solenoid (field strength 2000 oersteds) and reversing the field six times. The dispersion was then coalesced by heating for 70 seconds at a distance of 0.5″ from a panel maintained at 350° C. The coalesced film was stretched 6.3× at 96° C. and slit into tape. For this tape, the remanence ratio was 5.4 and 50% of the normalized X-ray diffraction intensity occurred within an angle of ±13.6° of the orientation direction.

Recording members prepared in accordance with this invention are of high quality and may be employed in any of the uses where magnetic recording is employed. For example, they may be used for audio and television recording, for instrumentation and computer applications and in various types of control equipment. The high remanence ratio of these recording members is a characteristic feature which renders them particularly useful in various applications.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. A process for orienting magnetically anisotropic particles of ferromagnetic chromium oxide in a recording member which comprises the step of exposing the member to a magnetic field while the binder is in a substantially fluid condition, whereupon at least partial alignment of the magnetic particles is effected, and after the binder has become self-supporting, elongating the member in the direction of particle alignment to effect further particle alignment, wherein said exposing to the magnetic field and said elongation of the member are each singly sufficient to produce a remanence ratio of at least 1.5.

2. The process of claim 1 wherein the magnetic particles, after being magnetically aligned, are mechanically oriented in the direction of particle alignment by stretching to at least 2× the original dimension.

3. Magnetic recording members comprising an anisotropic magnetic material of ferromagnetic chromium oxide and a binder therefor, obtained by exposing said magnetic material and binder to a magnetic field while the binder is in a fluid state and stretching said magnetic material and binder after the binder has coalesced., said members exhibiting at least 50% of the total normalized azimuthal X-ray diffraction intensity within an angle of 14° of the direction of orientation, the remanence ratio of said members being at least 5.3.

4. The magnetic recording members of claim 3 wherein the step of stretching comprises stretching to at least 2× the original dimension.

References Cited in the file of this patent

UNITED STATES PATENTS

| | | |
|---|---|---|
| 2,694,656 | Camras | Nov. 16, 1954 |
| 2,796,359 | Speed | June 18, 1957 |
| 2,849,312 | Peterman | Aug. 26, 1958 |
| 2,883,301 | Prichard | Apr. 21, 1959 |
| 2,900,282 | Rubens | Aug. 18, 1959 |
| 2,911,317 | Gabor | Nov. 3, 1959 |
| 2,937,028 | Supitilov | May 17, 1960 |
| 2,975,484 | Amborski | Mar. 21, 1961 |

FOREIGN PATENTS

| | | |
|---|---|---|
| 577,428 | Canada | June 9, 1959 |